F. O. & W. W. Tucker,

Toy Top,

No. 2,673, Reissued July 9, 1867.

Witnesses;
Charles E. Thompson
E. W. Baldwin

Inventors;
F. O. & W. W. Tucker.
by R. Fitzgerald. Atty

AM. PHOTO-LITHO. CO. N.Y. (OSBORNE'S PROCESS)

United States Patent Office.

FREDERICK O. TUCKER AND WILLIAM W. TUCKER, OF WEST MERIDEN, CONNECTICUT, ASSIGNEES BY MESNE ASSIGNMENTS OF THEMSELVES.

*Letters Patent No.* 55,591, *dated June* 12, 1866; *reissue No.* 2,673, *dated July* 9, 1867.

IMPROVEMENT IN TOY TOPS.

The Schedule referred to in these Letters Patent and making part of the same.

TO ALL WHOM IT MAY CONCERN:

Be it known that we, FREDERICK O. TUCKER and WILLIAM W. TUCKER, both of West Meriden, in the county of New Haven, and State of Connecticut, have invented a new and useful Improvement in "Toy Tops;" and we do hereby declare that the following is a full, clear, and exact description of the construction and operation of the same, reference being had to the accompanying drawings, which make part of this specification, in which—

Our improvement consists in the use of a whirling-spindle, to be operated by two cords in such a manner that by unwinding one cord it will wind up the other, so that after one of the cords has been wound on to one portion of the spindle, and one end of the other cord is attached, by unwinding one cord we wind up the other alternately.

Figure 2:
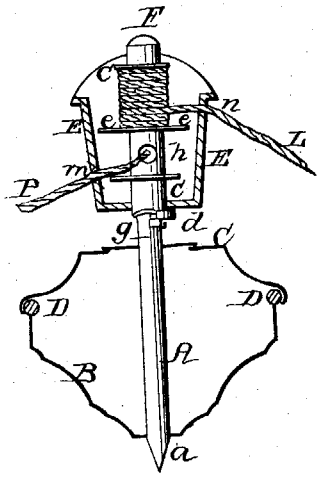
Figure 2 is a section of the top and whirling-spindle, cut vertically through the central part, showing how the two cords are attached to and wound upon the whirling-spindle, also the position of the ballast ring in the top.
Figure 1:
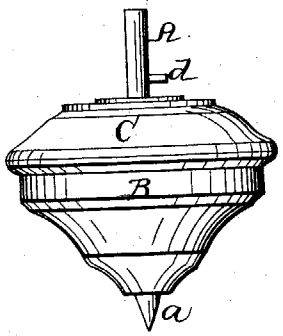
Figure 1 is a perspective view of the top, showing the pin in the stem by which the top is to be connected with the whirling-spindle.

We make the top of two disks of sheet metal, which we spin, raise, or strike up to the desired shape, substantially as represented at B and C, fig. 1, and indicated in fig. 2. And we make the "ballast ring" as a simple circle of wire, and before or at the time of clasping or locking the two parts B and C together, we insert the ballast ring, as indicated at D D, fig. 2, that is, at the point of the largest diameter of the top, because the further the ballast ring is from the centre, the less weight will be required to keep the top steady, or prevent its jumping or "dancing." And through the centre vertically we fit a stem or axis, as represented at A, figs. 1 and 2, on the point *a* of which the top spins or whirls, and in the upper portion of this stem A we fit a pin, as shown at *d*, which is to rest on the hook *g'*, fig. 2, to support the top while the cord P is being pulled to spin the top. We make the whirling-spindle of a metallic tube, or any other suitable substance, substantially as shown at F, with two holes in it, one of which is shown at *h*, but the other is concealed by the cord L, which is wound over it. And at the lower end we cut a transverse slot so as to leave a hook, as shown at *g'*, in which the pin *d* may rest. In the centre we fit a disk like *e e*, and near the ends we fit similar disks at *c* and *c'*, for the cords to wind against, that is, to serve as heads of spools. And on this whirling-spindle F we fit a case, as indicated in section at E E, which serves to cover or enclose the cord which is wound up, and also by means of two holes, as indicated at *m* and *n*, it serves to guide the cords while being wound up, and also when the cord is being pulled to spin the top, it so guides it as to cause the force to operate essentially at right angles to the spindle. (But guides of any other form would serve the purpose equally well.)

To use our "toy top" and whirling-spindle with the two cords, we attach the inner end of each of the two cords to the spindle F, as indicated at *h*, fig. 2, and wind one of the cords as L on to the spindle, leaving the other, as P, unwound, and pass them through the guide holes *m* and *n*, all as indicated in fig. 2. We then draw out the cord L, which will revolve the spindle F, and wind up the cord P in the opposite direction. We then attach the top by passing the upper end of the stem A into the hollow spindle, so that the pin *d* will rest in the slot or on the hook *g*, as indicated in fig. 2, when it will be ready for "spinning" the top by pulling out the cord P with a quick motion, which will give a rapidly revolving motion to both the spindle and the top, and when the cord P is all unwound, as shown at *h*, the top, by continuing to revolve in the same direction, will free the pin *d* from the hook *g*, and the top will fall to the floor and spin on its point *a* for as long a time as is due to the force applied in pulling the cord P, and by this operation the cord L will be again wound up, as represented in fig. 2, so that by pulling it out again we again wind up the cord P, when we are ready for "spinning" the top again. Thus we use the cord L to wind up the cord P, while we use the cord P to spin the top.

What we claim as our invention, and desire to secure by Letters Patent, is—

The combination of the whirling-spindle F with the two cords L and P, when they are constructed, arranged, and fitted for spinning or whirling the top, substantially as herein described and set forth.

F. O. TUCKER,
WM. W. TUCKER.

Witnesses:
JAMES G. BACON,
LEONIDAS R. HALL.